(12) United States Patent
Steinberg et al.

(10) Patent No.: US 8,525,885 B2
(45) Date of Patent: Sep. 3, 2013

(54) SYSTEMS AND METHODS FOR METERING AUDIO AND VIDEO DELAYS

(75) Inventors: Victor Steinberg, Sunnyvale, CA (US); Michael Shinsky, Menlo Park, CA (US)

(73) Assignee: Videoq, Inc., Santa Clara ( * ) Notice: Subject to any disclaimer, the term of this patent is extended or adjusted under 35 U.S.C. 154(b) by 43 days.

(21) Appl. No.: 13/107,942

(22) Filed: May 15, 2011

(65) Prior Publication Data

US 2012/0287288 A1   Nov. 15, 2012

(51) Int. Cl.
*H04N 17/00* (2006.01)
*H04N 17/02* (2006.01)
*H04N 9/475* (2006.01)

(52) U.S. Cl.
USPC ............................ 348/191; 348/192; 348/518

(58) Field of Classification Search
USPC .................................. 348/512, 515, 177–192
See application file for complete search history.

(56) References Cited

U.S. PATENT DOCUMENTS

| | | | |
|---|---|---|---|
| 4,963,967 A | 10/1990 | Orland et al. | |
| 7,064,831 B2 * | 6/2006 | Lutz et al. | 356/405 |
| 7,692,724 B2 * | 4/2010 | Arora et al. | 348/515 |
| 2005/0219366 A1 | 10/2005 | Hollowbush et al. | |
| 2011/0013085 A1 * | 1/2011 | Kulyk | 348/520 |

FOREIGN PATENT DOCUMENTS

JP        2005184749 A  *  7/2005

* cited by examiner

*Primary Examiner* — Michael Lee
(74) *Attorney, Agent, or Firm* — Tran & Associates (57) ABSTRACT

A system to perform automated audio visual (AV) delay measurement for a system under test (SUT) includes a test pattern generator to generate a dynamic AV test pattern and connected to a source display device and to one or more destination video display devices; at least one light sensor coupled to the one or more destination video display devices; an AV capture device having video inputs connected to the light sensors; and an AV delay analyzer coupled to the AV capture device to perform multi-channel delay parameters analysis.

20 Claims, 7 Drawing Sheets

Glass-to-Glass Teleconference System Latency Measurement:
Camera + Coder + Network + Decoder + Display-2

SYSTEMS AND METHODS FOR METERING AUDIO AND VIDEO DELAYS

The present invention relates to audio and video measurement systems.

Advances in compression technology, along with faster transmission media, have lead to increasing use of video in modern life in analog/digital teleconference, surveillance and video broadcast systems, and other video delivery systems. With the introduction of advanced digital delivery systems for audio and video, there is an increased awareness of the timing relationship between audio and video. Technologies such as Digital Television (DTV), digital video disk (DVD), Direct Broadcast Satellite (DBS), and Digital Cable use advanced data compression technologies such as Dolby Digital (AC-3) for audio and MPEG-2 for video to deliver extremely high-quality programming to consumers. During playback, misalignments in the streams can lead to audio/video synchronization problems. To reduce synchronization problems, video delay measurements need to be done on the video source and destination systems.

Current means of video delay measurements consist mainly of some light-emitting device, such as light emitting diodes (LEDs or LED matrix array), installed before video camera and flashing with some pre-defined period, e.g. every second, plus a light-sensitive device, such as phototransistor, fixed on or before a screen displaying the received picture of the LEDs. The electric pulse driving each LED is compared with the similar pulse produced by light-sensitive device and the time interval between the front edges of these two pulses represents the propagation delay (latency) of the System Under Test (SUT).

Despite the obvious advantage of simple and straight-forward structure this traditional approach has serious disadvantages with application to modern video systems using mainly compressed video and network-based video delivery means. First, static (typically black) background and small size of light-emitting devices result in a mainly static test pattern picture lacking moving details and do not create enough payload for compressed stream. Consequently, such measurement setup is far away from normal work condition of video CODECS, or enCOder/DECoder circuits that perform analog-to-digital conversion (ADC) and digital-to-analog (DAC) conversion of the video signal. Second, the test pattern contains no components suitable for subjective visual estimate of "normal" system operation, e.g. checking of video frames cadence/continuity.

As to Audio Delay (Audio Latency) measurements, they are typically done manually using some software or hardware waveform monitors displaying input and output audio signals on two separate tracks. Relative delay between video and audio parts of the System Under Test (AV Sync error) is typically measured by tedious manual comparison of multiple timing parameters, i.e. observing several tracks displayed on a screen of multi-channel waveform monitor.

Another solution provides a rough estimation of the AV Sync error. This is typically achieved by subjective aural and visual assessment, using some sophisticated dynamic test pattern containing moving progress bar and regularly beeping sound pulses. Widely used "Test Card M" test pattern, developed jointly by BBC (UK) and Snell & Wilcox Ltd (UK), is a good example of this approach. However, subjective assessment accuracy is relatively low—estimates of AV Sync errors may be offset up to +/−50 ms. By definition, this method relies on the existence of fully tested "reference" audiovisual monitor, which does not introduce its own AV Sync errors. Quite often this assumption is not true. Further, the subjective method does not provide for the estimation of significant propagation delays, which in modern systems may go as high as several hundreds of milliseconds.

SUMMARY

In one aspect, a system to perform automated audio visual (AV) delay measurement for a system under test (SUT) includes a test pattern generator to generate a dynamic AV test pattern and connected to a source display device and to one or more destination video display devices; at least one light sensor coupled to the one or more destination video display devices; an AV capture device having video inputs connected to the light sensors; and an AV delay analyzer coupled to the AV capture device to perform multi-channel delay parameters analysis.

Implementations of the above aspect can include one or more of the following. The system can apply test patterns that contain audio and video components equally suitable for (1) aural and visual estimation, (2) for on-line or off-line instrumental analysis, and (3) for fully automated on-line or off-line analysis. The Test Pattern components include several Light Sensor Areas regularly flashing with pre-defined period, e.g. every second, e.g. going from Black to White during a number of video frames, e.g. during one or two frames. Optional Test Pattern components are additional Light Sensor Areas regularly flashing with a different pre-defined period, e.g. three consecutive Yellow Flashes in three separate Areas each of ⅙ s duration, total three flashes cycle duration of ½ s, thus providing for frame continuity tests. Further optional components of the Test Pattern are full screen width Blue Flashes co-timed with the White Flashes, thus providing for display latency (rendering latency) tests. The Test Pattern components also include optional Audio Beep Pulse synchronized with some of the White Flashes, and some more optional enhancement components, such as high contrast detailed background, regularly updated frame number characters, moving white dots, timeline progress markers, numbered timeline grids, and additional video components allowing differentiation between Left and Right Channels of frame-sequential 3D TV systems, e.g. two separate Light Sensor Areas flashing White during Left or Right frames correspondingly. The flashing Light Sensor Areas, e.g. several circles, are surrounded by dark background; each Light Sensor Area size is slightly larger than a part of the smallest display screen, occupied by Light Sensor attached to such screen, but significantly smaller than full screen surface, thus avoiding excessive stress of low bitrate compression codecs by white flashes energy; practical experiments indicate that optimal Light Sensor Area size is in the range from 2% to 10% of the total screen surface. The White Flashes can occur during two consecutive video frames, thus matching the typical duration of video conference system frame (1/30 of a second) with the typical playout device frame rate of 60 frames per second. The timeline positions of said Audio Beep Pulses (e.g. bursts of 1 kHz frequency) match the timeline positions of the White Flashes; signal within Audio Beep Pulses may include optional gap of one or more sinusoidal cycles duration (e.g. 1 ms), thus providing for more accurate detection of the audio burst center position. The Light Sensors can be implemented as a light-sensitive variable resistance element, e.g. phototransistor, mounted inside small opaque body having one hole equipped with the cable fitting, e.g. small cable connector, and another hole allowing the display screen light emission to reach the light-sensitive element. The hole in the body of Light Sensor is covered with the transparent vacuum cap purposed to attach the Sensor to the display screen. The light Sensors is remotely powered from the corresponding AV Delay Analyzer input via shielded differential (balanced) pair of wires connected to it, thus providing for noise-immune and long distance connectivity. The input signal of AV Delay Analyzer capture device can be processed by a differential receiver followed by voltage comparator, thus allowing a large range of input signal levels and providing for noise-immune operation with relatively long cables. For fast and easy setup, the activity of each AV Delay Analyzer input can be indicated on its front panel, e.g. by a flashing LED driven by the output of the comparator. For AV Delay Analyzer software processing purposes all audio and video input signals are grouped via the appropriate GUI into pairs of video inputs and pairs of audio inputs, each pair consists of one Reference Point and one Test Point, thus performing independent calculation of several Latency values—one video Latency or one audio Latency value per pair. The AV Delay Analyzer software can calculate the AV Synchronization Error as a difference between Audio Latency of the audio pair and Video Latency of the video pair; those two pairs are selected via the appropriate AV Sync GUI from two lists of available (pre-selected) audio and video pairs. Alternatively, for AV Delay Analyzer software processing purposes all audio and video inputs are permanently tested by this software for validity; test is performed by way of calculation of the data pulses periodicity (number of pulses per time interval); only validated pulses are used for further processing; the software GUI regularly updates the display of the multi-channel validity results. The AV Delay Analyzer software GUI allows selection of the desired Test Duration within the wide range of values: from few seconds to thousands of seconds, whilst the selected total Test Duration is automatically subdivided into a number of fixed analysis intervals, e.g. 10 seconds each interval, thus allowing multi-channel noise-reduction by calculation of short-term averaged values. In another implementation, for AV Delay Analyzer software processing purposes all calculated current multi-channel Latency values are stored as matrix arrays together with the corresponding timeline positions; the software GUI displays both current status of those values and the results of standard statistical processing of all data accumulated up to and including the last complete analysis interval, such as global average delays between each pair of inputs, mean, minimum and maximum delay values, delay trends, trend-adjusted standard deviations, etc. The video output of the AV Delay Analyzer is connected to its Video Reference input via the adapter converting said Blue Flash component of the Test Pattern into the Sync Pulse co-timed with the White Flash component, thus providing for display latency (rendering latency) tests.

Advantages of the preferred embodiments may include one or more of the following. The system allows multi-channel automated AV Delays measurements by (1) installation of a Test Pattern Generator driving the Display Device, which in turn faces the System Under Test front-end device(s), such as TV camera(s) and/or microphone(s), (2) addition of photo-sensitive device(s), reading the light output(s) of the System Under Test back-end devices, such as video display(s), and optional addition of electric and/or sound pressure sensitive devices, reading audio signals or sound(s) of the System Under Test back-end devices, such as loudspeaker(s), and (3) capture of sensors data and further processing of the captured data by sophisticated software Analyzer. The proposed AV Delay Meter can be used in 3D TV systems to check for possible errors of Left-Right synchronization during the frame sequential 3D TV transmission. With reference to the 2D version, the 3D Sync Error Meter video processing requires only minor modifications in the test pattern layout and data processing software algorithm.

BRIEF DESCRIPTION OF THE DRAWINGS

Embodiments of the invention described herein will become apparent from the following detailed description considered in connection with the accompanying drawings, which disclose several embodiments of the invention. It should be understood, however, that the drawings are designed for the purpose of illustration and not as limits of the invention.

Embodiments of an AV delay metering system will now be described by way of example with reference to the accompanying drawings in which.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The following description of the present system is done by the way of non-exclusive example of how an AV Delay Meter (Audio and Video Latency and AV Sync Measurement Device) operates in an environment where video content is distributed along some data-casting services. In one embodiment, the AV delay meter system includes a Test Pattern Generator (AV Signal Source) loaded with the special dynamic AV Test Pattern and connected to standard video display device, e.g. HD video monitor (Light Source); at least one Light Sensor attached to the screen(s) of destination video display device(s) and optionally to the source video display device; an AV Delay Analyzer capture device having video inputs connected to the Light Sensors and optional audio inputs connected to the source and destination audio signals; and an AV Delay Analyzer software reading the data captured by AV Delay Analyzer capture device and converting them into Detailed Report file for documentation purposes plus machine-readable Short Report file for fully automated QA/QC systems; both reports contain same results of multi-channel delay parameters analysis and differ only in the resulting data presentation format.

In one variant of the preferred embodiment, the optional additional components of the AV Delay Meter are the loudspeaker converting audio component of the test pattern into sound wave and microphone converting the output sound wave into electric signal.

In a further variant of the preferred embodiment, the optional additional component of the AV Delay Meter is the Pulse Viewer Software displaying the pre-captured multi-channel data in the multi-track waveform format with timeline markers—this component serves mainly for the system debugging and for advanced users.

In one more variant of the preferred embodiment, the optional additional component of the AV Delay Meter is the adapter converting Blue Flash component of the test pattern into the sync pulse, which can be used as a timing reference whilst measuring the rendering delay of display devices. The AV Delay Meter is built using components readily available on the market.

Figure 1:
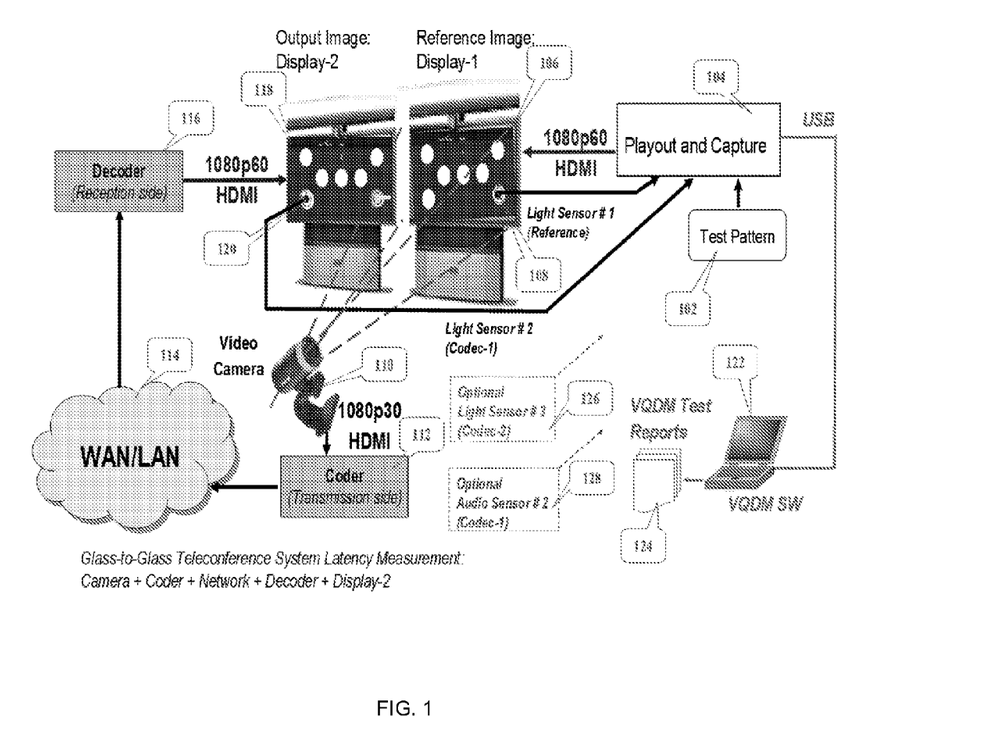
FIG. 1 illustrates an exemplary general measurement setup using proposed AV Delay Meter.

Referring initially to FIG. 1, it should be noted that main purpose of the AV Delay Meter is to produce AV Delay Report containing detailed information about the timing profile of audio and video components at several test points within the System Under Test (SUT).

Dynamic Test Pattern 102 played out by the Test Pattern Generator, contained in the AV Delay Meter box 104 (designated in FIG. 1 as "Playout & Capture"), appears on the screen 106 of the Display-1. It contains among other components a number of Light Sensor Areas flashing white with known period, e.g. 1 second.

The Light Sensor 108 (designated on the drawing as "Light Sensor #1") is attached to one of those flashing area; it converts light energy into electric pulse transmitted back to the AV Delay Meter box 104, where this pulse is used as a timing reference.

This reference image of the screen 106 is converted by the camera 110 (front-end device of the System Under Test) and the attached coder 112 into a AV stream transmitted via network 114 to the reception site decoder 116. Image on the screen 118 of Display-2, driven by the signal from the reception side decoder 116, is delayed vs. the reference screen 106 image by some number of ms—typically from few tens to several hundred milliseconds. The propagation delay from Display-1 screen 106 to the Display-2 screen 118 is usually designated as "Glass-to-glass Video Latency".

Light Sensor 120 attached to the screen 118 also converts White Flashes energy into electric pulse coming to the second video inputs of the AV Delay Meter box 104. In this box all input pulses are converted into digital data, e.g. each data byte is subdivided into 8 single bit channels—4 bits for 4 video channels and 4 bits for 4 audio channels. Via USB connection these data clocked at some relatively high frequency, e.g. 100 kHz, are captured by the software Analyzer installed on host PC 122, e.g. notebook shown on the diagram.

Software processes captured multi-channel data bytes and produces the Analysis Report 124 containing all details about System Under Test Video Latency. At least one pair of video inputs should be available: Reference Point and Test Point.

More Test Points can be added as needed; the additional Test Points may refer to the same Reference Point; addition of extra Reference Points is also possible. This is illustrated on the drawing in form of two optional sensors 126 and 128 for extra video and audio inputs correspondingly.

Addition of any Audio Test Point requires availability of at least one Audio Reference Point. Optional audio component of the Test Pattern is usually fed and taken directly to and from the corresponding outlets of the System Under Test—no special Sensors are usually required. If such outlets are not available, then optional loudspeaker(s) and microphone(s) may be used to convert between sound wave(s) and electric signal(s) appropriate for the System and AV Delay Meter inputs.

The exemplary system of FIG. 1 can handle testing for a variety of analog or digital teleconference, surveillance and video broadcast systems. The system can measure important parameters of audio-visual content delivery are delay trend and delay variation within this trend. The AV Delay Meter improves the speed and accuracy of overall video content delivery system quality control. Acceptance tests, maintenance tests and benchmarking comparisons of any consumer or professional device or system that has the ability to delay audiovisual signals, may be tested according to this system. Short-term analysis (with proper analysis of the delay parameters temporal profile during significant time interval—up to thousands of seconds) improves accuracy of results. In particular, the system reduces the possibility where the received digital data error-rate intermittently goes over the so called "digital cliff" or when the System Under Test uses modern sophisticated solutions such as variable frame-rate, variable bit-rate and/or switchable video frame size.

The system of FIG. 1 is especially useful where the datacasting services are utilizing networks or "cloud" channels with unstable or variable propagation delays.

Figure 2A:
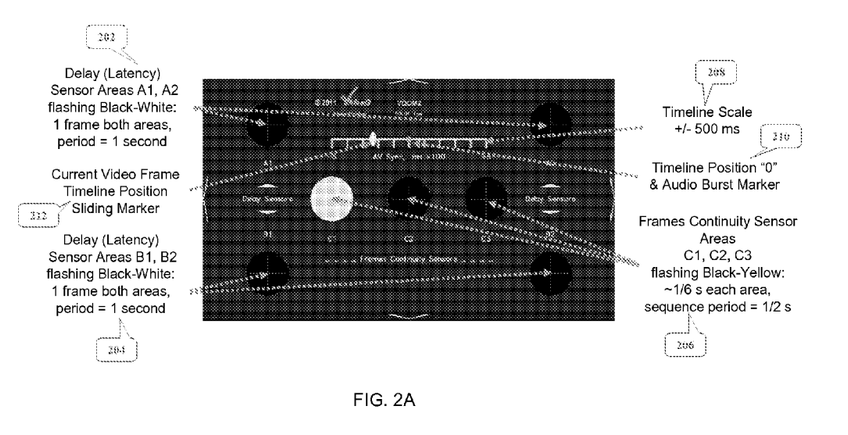
FIG. 2 shows an exemplary general layout and timing diagrams of dynamic AV test pattern used by the proposed AV Delay Meter.

Referring now to FIG. 2A, it should be noted that besides the Light Sensor Areas flashing White with given periodicity the Test Pattern contains some other components serving for subjective estimation and frame continuity checks. These components are optional enhancements. Audio component in form of periodic frequency bursts is also optional, it is not needed for Video Latency measurement, but it must be present if Audio Latency and/or AV Sync Error should be measured.

Dynamic test pattern contains four Delay Sensors Areas subdivided into two groups: Group 202 (A1_A2) and Group 204 (B1_B2). The only difference between these two groups is vertical position on the screen. Group 202 can be used both for general latency measurement and for rendering device latency (display latency). Display latency measurement option works only in combination with special adapter processing Blue Flashes as described further below.

Group 204 also can be used for general latency measurement. Moreover, it also allows measurement of display latency vertical profile by way of comparison with Group 202: B1_B2 with respect to A1_A2.

Figure 2B:
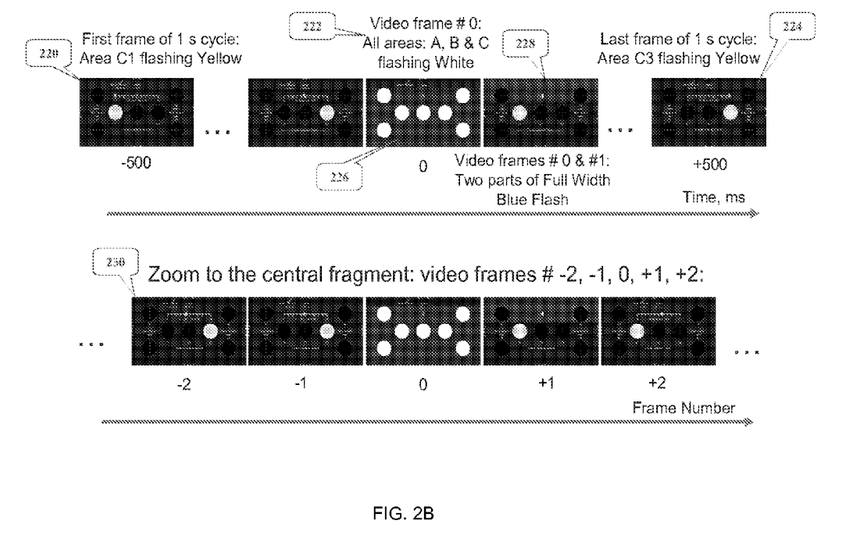

FIG. 2B shows the video timeline profile of the proposed test pattern. At the time moment 220 (start of the sequence first frame) the only lit Sensor Area is the area C1 producing yellow light. All Light Sensors (like 108 and 120 on FIG. 1) have about the same sensitivity to yellow and white light stimuli, but Blue Flash detector in the mentioned adapter is sensitive only to Blue and White, it is not sensitive to Yellow. Yellow flash in the area C1 stays on for about ⅙ of a second, then it switches to off condition, but area C2 is becoming lit producing yellow light, then C3, then C1 again and so on. This process is interrupted when the sequence approaches moment 222, i.e. Frame #0 which is the central frame of the entire 1000 ms long cycle.

During Frame #0 all three groups of Light Sensor Areas (A, B and C) are lit producing white light; this light stimuli serves as general video timeline reference. After Frame #0 the process of cyclic yellow flashes C1, C2, C3 continues until the end moment 224 of last frame, then the sequence repeats (moment 220).

In addition to the abovementioned white flashes, Frames #0 and #1 contain Blue Flash component consisting of two parts: 226 and 228. Combined duration of two parts is exactly the duration of one video frame, but they are offset along the timeline to match the timeline position of Group A, thus providing accurate electric reference signal for rendering devices latency measurement. Via special adapter the Blue component of this signal can be converted into Sync Pulse supplied to the reference input of the AV Delay Meter 104.

Zoomed fragment 230 on FIG. 2*b* shows more details of the frames adjacent to the central Frame #0.

FIG. 2B shows the audio timeline profile of the proposed test pattern.

Figure 2C:
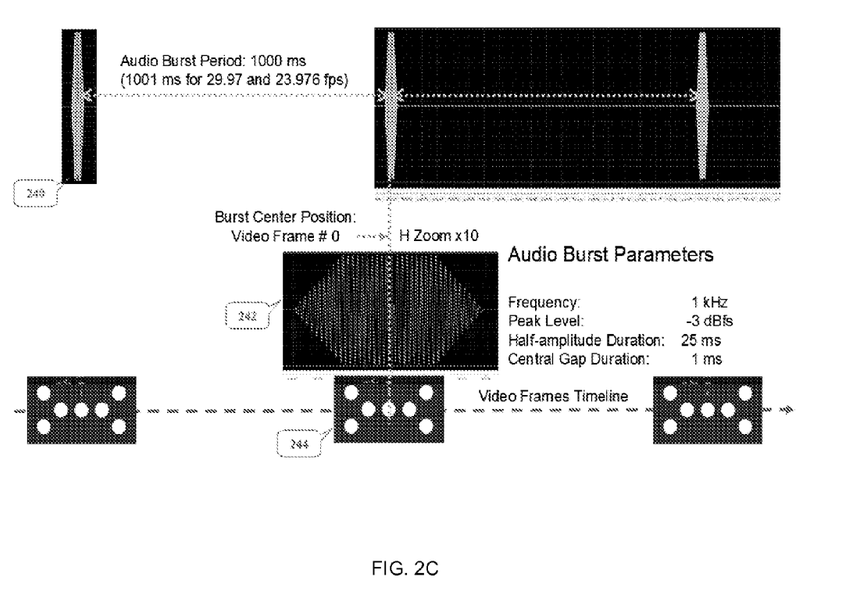

Audio burst 240 (zoomed waveform 242) central point is co-timed with moment 244, i.e. with Frame #0, when all three groups of Light Sensor Areas (A, B and C) are lit producing white light. Thus, at least at source, Audio Reference signal is approximately co-timed with Video Reference. It should be noted that proposed AV Sync measurement methodology does not requires perfect synchronization of Audio and Video References—audio latency is measured separately from video latency and AV sync errors are merely a difference of two separately derived values. However, for subjective (visual and aural) AV Sync errors estimation it is desirable to keep test pattern audio component timing close enough to the video component timing.

Figure 3:
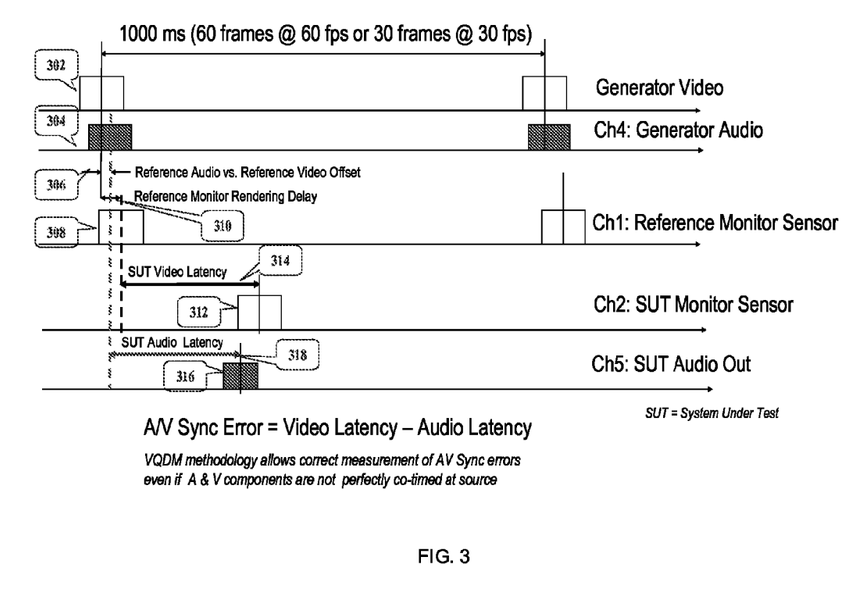
FIG. 3 shows an exemplary timing diagrams for AV Sync measurement using two separate sub-systems for Audio Latency and Video Latency measurements.

FIG. 3 illustrates one important advantage of the proposed methodology: Video Latency is measured separately from Audio Latency—they form two independent channels. Thus, any (even significant) delay introduced by Display-1, shown on FIG. 1, does not affect the calculated value of Audio Delay.

Test Pattern Generator Video output 302 may appear a bit earlier than it Audio output 304; the timing difference 306 is designated as Reference Audio vs. Reference Video Offset.

Light Sensor 108 attached to the screen 106 of the display showing the Reference Test Pattern Image produces electric pulse 308, delayed wrt Reference Video 302 by the rendering device delay 310. This delay does not affect overall glass-to-glass latency measurement results because the System Under Test front-end Device (camera 110) and Light Sensor 108 are driven by the same light stimulus, not by electric signal.

Light Sensor 120 attached to the screen 118 of the reception side display produces electric pulse 312, delayed wrt Reference Pulse 308 by the overall video system delay 314.

Actual numerical value of the delay 314 represents the most important result—one-way visual latency from camera lens to the display screen.

Audio latency 316 is measured in a similar way—as timing difference between the system audio output 318 and the Generator Audio output 304.

Finally, AV Sync Error is calculated as a difference between two Latencies, thus replicating the real teleconference conditions, where the speaking person image, transmitted by the camera, is replaced by the White Flash on Diplay-1 screen and the sound produced by this person is replaced by the Audio Beep.

Figure 4:
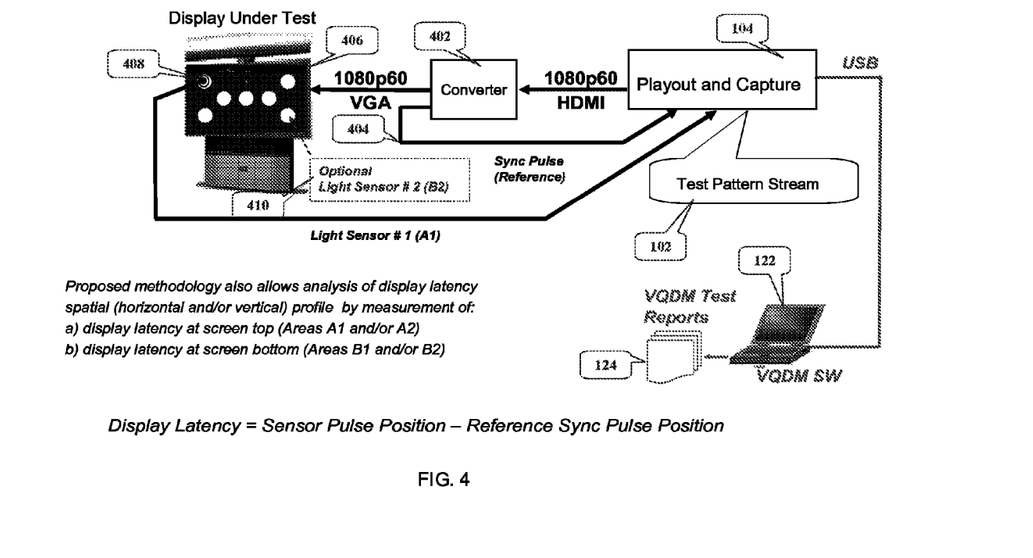
FIG. 4 shows an exemplary setup for display latency measurement case.

FIG. 4 shows the setup for display latency measurement case. Test Pattern 102, Playout and Capture device 104 and the host PC 122 connections are as on FIG. 1, but there is one important new device—adapter 402 converting Blue Flash component of Reference Video into Sync Pulse 404 supplied to the reference input of the AV Meter 104.

Light output from the Display screen 406 area A1 is read by Sensor 408 and the resulting pulse is supplied to the CH2 input of the AV Meter 104.

This Light Sensor 408 is the only one, which must be used in the setup.

Second (optional) Light Sensor 410 may be used, if there is a need to check vertical timing profile of the display under test. Typical LCD displays produce light output from the B areas about 10 ms later then from the A areas. However, some plasma displays introduce larger overall delays, but areas A delays are equal to areas B delays.

Figure 5:
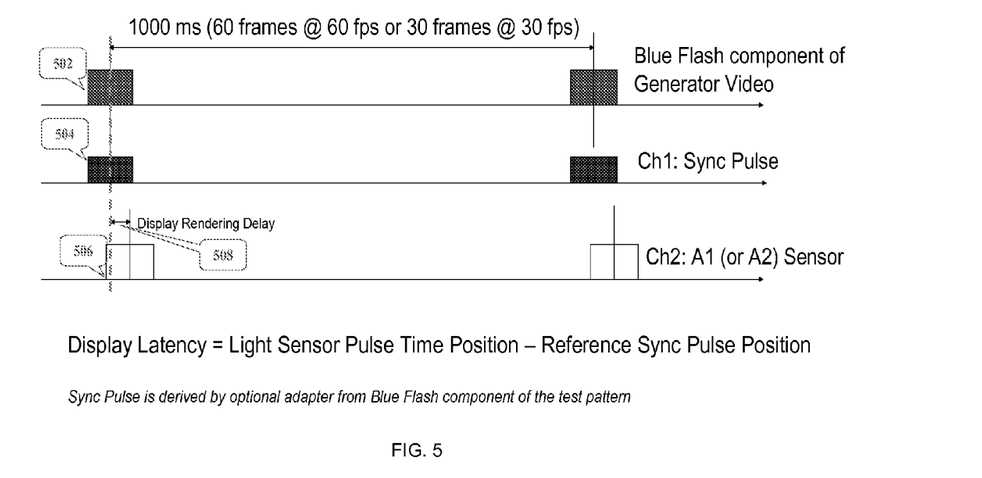
FIG. 5 shows an exemplary timing diagram for display latency measurement.

FIG. 5 shows the timing diagram for display latency measurement.

Conversion of the Blue Flash component of the Generator Video 502 to the Sync Pulse 504 in the adapter 402 is purely electronic process, so it does not introduce any significant delay, comparable with the display rendering delay.

Due to the special timeline offset Blue Flash component of the test pattern is co-timed with the area A light output of the "ideal" (zero latency) display. This light energy is converted to the electric pulse by the Light Sensor 408.

Thus, the display latency 508 can be accurately measured as a difference between timeline positions of Light Sensor output 506 and the Generator Video 502.

Figure 6:
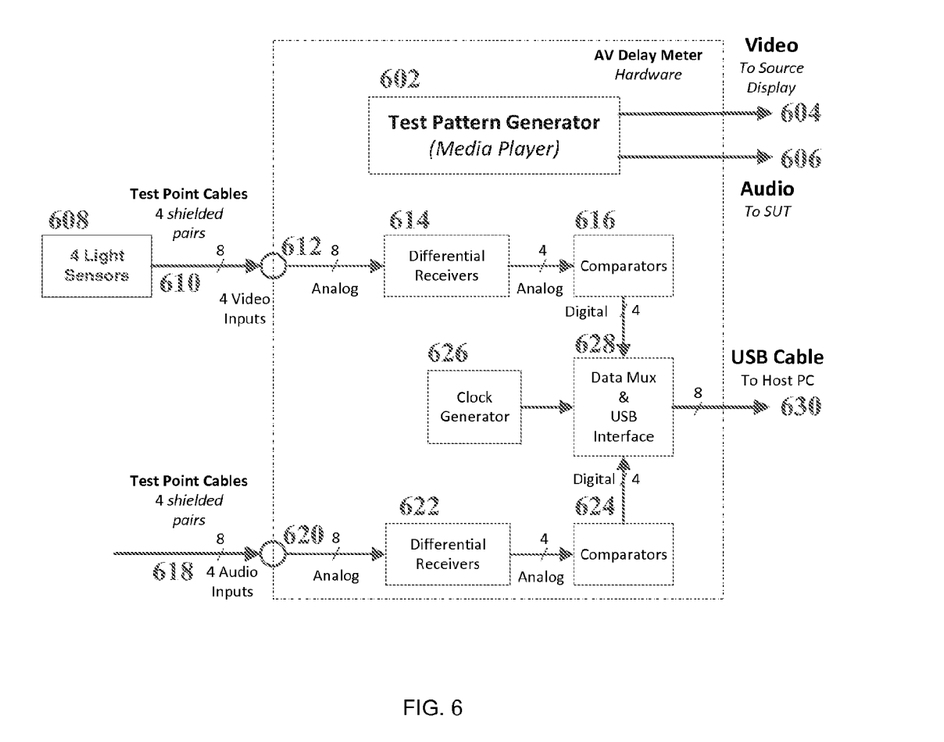
FIG. 6 shows Hardware Block Diagram of one embodiment of an Audio and Video Delays Meter.

Referring now to FIG. 6, it should be noted that there are many possible embodiment of the proposed AV Delay Meter hardware.

In the example shown the playout module 602 is implemented in form of standard off-the-shelf media player playing-out the Test Pattern in the variety of appropriate frame rates and resolutions.

Video and audio components of the test pattern signal, e.g. in HDMI format, is supplied to the output 604. Auxiliary analog audio signal is also available at output 606.

In the example shown AV Delay meter has four video channels and four audio channels.

Electric pulses from four Light Sensors 608 via four cables 610 (shielded pair type—total eight wires) are coming to the four input sockets 612. These two-wire cables 610 also provide power for the active photo-sensitive elements inside the Light Sensors 608.

Differential receivers 614 serve to suppress possible interferences and provide strong and clean analog signals suitable for digitization in the comparators 616.

Four comparators 616 produce four single bit digital signals (in form of "0" or "1" levels) suitable for further sampling and multiplexing in the data multiplexer 628.

Free-running clock generator 626 provides stable clock (time-base) of known frequency, e.g. 100 kHz. The sampling period of 0.01 ms is quite small in comparison with the measured latencies range of +/−499 ms, thus the sampling process does not introduce any additional errors.

Separately and independently four optional audio signals via shielded pair cables 618 are coming to four audio inputs 622. Then they are processed by differential receivers 622 and comparators 624, similar, but not identical to blocks 614 and 616.

Finally, digitized video and audio bits are multiplexed into eight-bit bytes in the multiplexer 628 and sent to host PC via standard USB cable 630. Thus, every byte of transmitted data contains combined timing information of up to four video channels and up to four audio channels.

Important feature of this design is the absence of any external or internal time reference signal; the only relevant information is relative timing of transmitted channels.

For example, in the 8-channels per byte arrangement, delays of three video channels labeled "Channel 2", "Channel 3" and "Channel 4" are calculated with reference to the Channel 1 (which is also called "Video Reference") and delays of three audio channels labeled "Channel 6", "Channel 7" and "Channel 8" are calculated with reference to the Channel 5 (which is also called "Audio Reference").

This feature provides for robust handling of volatile signals and makes the proposed delay meter immune against intermittent time shifts and even temporary loss of signals.

Figure 7:
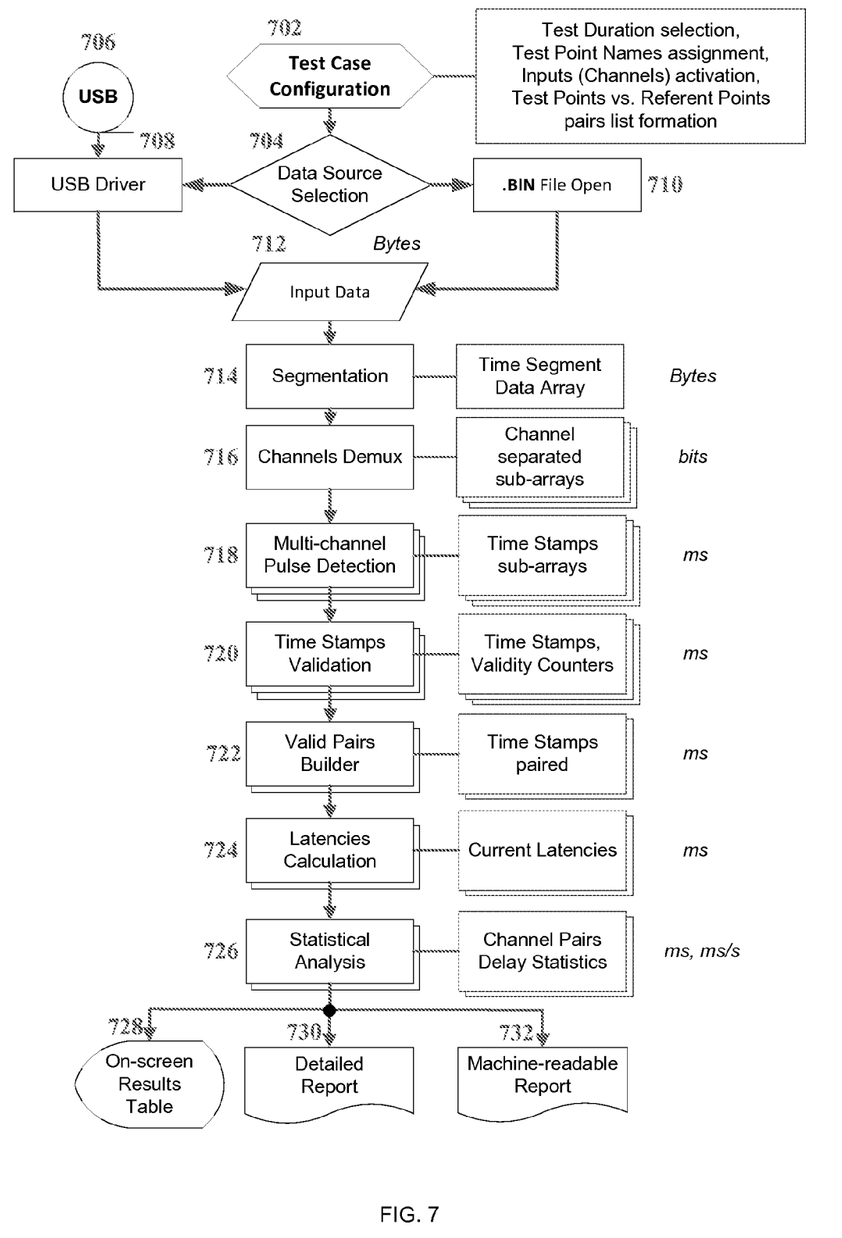
FIG. 7 shows an exemplary Software Workflow Diagram of Audio and Video Delays Meter.

FIG. 7 shows the workflow diagram of the software processing. At this stage, data can be received by host PC through various means including a disk drive, a USB cable or other suitable cables such as Firewire, for example.

First step 702 is Test Case configuration. At this stage User selects or recalls all Test Session parameters, such as Test Session Name, Test Duration, Test Point Names, Inputs (Channels) activation, Test Points vs. Referent Points pairing, etc.

Next step 704 consists of data source selection: either live data from the USB cable 706 via the driver 708, or pre-captured binary data stored in the file 710. Result of the acquisition step 704 is temporary array of bytes 712; this array should be processed at next steps. Size of this array must be large enough to accommodate the data acquired during multiple test pattern cycles (each cycle duration is 1 second). For example, at 100 kHz sampling, storage of 10 seconds of AV Delay Meter data requires only 1 MB of RAM, which is easily available on any modern PC.

At step 714 acquired data are first segmented into chunks of fixed size, e.g. each chunk is 10 seconds long; this process is called "Segmentation".

At step 716 the stored data bytes are split into eight separate single-bit channels.

At step 718 all eight channels are processed in parallel. This step allows finding pulses positions within the chunk, e.g. in Channel 1 pulses are found at positions 0.3, 1.3, 2.3, . . . 9.3 ms and in Channel 2 pulses are found at positions 0.5, 1.5, 2.5, . . . 9.5 ms.

At step 720 detected pulse positions are validated; pulses are tested to satisfy several conditions: minimum and maximum width, distance to neighboring pulse, etc. Validated pulse positions are marked by the corresponding flags and counted to provide validity statistics.

At step 722 validated pulses are paired. For example in Channel 1 time position 1.3 ms found to be valid and in Channel 2 time position 1.5 ms found to be valid. Distance between these two positions is 0.2 ms, i.e. in the valid range of +/− 499 ms. Thus, these two pulses form a valid pair, resulting in the valid latency value of +0.2 ms for Channel 2 vs. Channel 1 pair.

At steps 724 valid pairs latency values of the whole chunk are averaged and local statistical values are calculated resulting in the current multi-channel delay profile ready for display and further statistical processing.

At step 726 all accumulated values of all processed chunks are undergoing further statistical processing. The results are global average latency values, average AV Sync errors, global validity counts, multi-channel trend values, standard deviations, etc.

Finally, all global Test Session results are presented in three formats:

1. On-screen Results Summary Table 728
2. Detailed printable Report 730, e.g. PDF file
3. Machine-readable Report 732, e.g. Excel spreadsheet file.

One implementation of the automated Audio and Video Delay Measurement can include a dynamic Test Pattern Playout Device driving the standard display device (source) installed before the front-end device of the System Under Test, such as TV camera. At least one Light Sensor device can be installed before or attached to the screen of the back-end (destination) device of the System Under Test, e.g. to the screen of standard video monitor. An AV Delay Analyzer capture device having a number of Video Inputs, connected to the Light Sensors, and a number of optional Audio Inputs, connected to audio test points of the SUT. Further, an AV Delay Analyzer capture device contains multi-channel processor converting the incoming audio and video signals into a multi-channel data stream sent to a host computer or PC over a standard connection such as USB port or Firewire port, among others. Additionally, an AV Delay Analyzer software can be installed on a host PC and converting the captured multi-channel data into final Analysis Report.

In one embodiment, the system can apply test patterns that contain audio and video components equally suitable for (1) aural and visual estimation, (2) for on-line or off-line instrumental analysis, and (3) for fully automated on-line or off-line analysis. The Test Pattern components include several Light Sensor Areas regularly flashing with pre-defined period, e.g. every second, e.g. going from Black to White during a number of video frames, e.g. during one or two frames. Optional Test Pattern components are additional Light Sensor Areas regularly flashing with a different pre-defined period, e.g. three consecutive Yellow Flashes in three separate Areas each of ⅙ s duration, total three flashes cycle duration of ½ s, thus providing for frame continuity tests. Further optional components of the Test Pattern are full screen width Blue Flashes co-timed with the White Flashes, thus providing for display latency (rendering latency) tests. The Test Pattern components also include optional Audio Beep Pulse synchronized with some of the White Flashes, and some more optional enhancement components, such as high contrast detailed background, regularly updated frame number characters, moving white dots, timeline progress markers, numbered timeline grids, and additional video components allowing differentiation between Left and Right Channels of frame-sequential 3D TV systems, e.g. two separate Light Sensor Areas flashing White during Left or Right frames correspondingly. The flashing Light Sensor Areas, e.g. several circles, are surrounded by dark background; each Light Sensor Area size is slightly larger than a part of the smallest display screen, occupied by Light Sensor attached to such screen, but significantly smaller than full screen surface, thus avoiding excessive stress of low bitrate compression codecs by white flashes energy; practical experiments indicate that optimal Light Sensor Area size is in the range from 2% to 10% of the total screen surface. The White Flashes can occur during two consecutive video frames, thus matching the typical duration of video conference system frame (1/30 of a second) with the typical playout device frame rate of 60 frames per second. The timeline positions of said Audio Beep Pulses (e.g. bursts of 1 kHz frequency) match the timeline positions of the White Flashes; signal within Audio Beep Pulses may include optional gap of one or more sinusoidal cycles duration (e.g. 1 ms), thus providing for more accurate detection of the audio burst center position. The Light Sensors can be implemented as a light-sensitive variable resistance element, e.g. phototransistor, mounted inside small opaque body having one hole equipped with the cable fitting, e.g. small cable connector, and another hole allowing the display screen light emission to reach the light-sensitive element. The hole in the body of Light Sensor is covered with the transparent vacuum cap purposed to attach the Sensor to the display screen. The light Sensors is remotely powered from the corresponding AV Delay Analyzer input via shielded differential (balanced) pair of wires connected to it, thus providing for noise-immune and long distance connectivity. The input signal of AV Delay Analyzer capture device can be processed by a differential receiver followed by voltage comparator, thus allowing a large range of input signal levels and providing for noise-immune operation with relatively long cables. For fast and easy setup, the activity of each AV Delay Analyzer input can be indicated on its front panel, e.g. by a flashing LED driven by the output of the comparator. For AV Delay Analyzer software processing purposes all audio and video input signals are grouped via the appropriate GUI into pairs of video inputs and pairs of audio inputs, each pair consists of one Reference Point and one Test Point, thus performing independent calculation of several Latency values—one video Latency or one audio Latency value per pair. The AV Delay Analyzer software can calculate the AV Synchronization Error as a difference between Audio Latency of the audio pair and Video Latency of the video pair; those two pairs are selected via the appropriate AV Sync GUI from two lists of available (pre-selected) audio and video pairs. Alternatively, for AV Delay Analyzer software processing purposes all audio and video inputs are permanently tested by this software for validity; test is performed by way of calculation of the data pulses periodicity (number of pulses per time interval); only validated pulses are used for further processing. The software GUI regularly updates the display of the multi-channel validity results.

The AV Delay Analyzer software GUI allows selection of the desired Test Duration within the wide range of values: from few seconds to thousands of seconds, whilst the selected total Test Duration is automatically subdivided into a number of fixed analysis intervals, e.g. 10 seconds each interval, thus allowing multi-channel noise-reduction by calculation of short-term averaged values. In another implementation, for AV Delay Analyzer software processing purposes all calculated current multi-channel Latency values are stored as matrix arrays together with the corresponding timeline positions; the software GUI displays both current status of those values and the results of standard statistical processing of all data accumulated up to and including the last complete analysis interval, such as global average delays between each pair of inputs, mean, minimum and maximum delay values, delay trends, trend-adjusted standard deviations, etc. The video output of the AV Delay Analyzer is connected to its Video Reference input via the adapter converting said Blue Flash component of the Test Pattern into the Sync Pulse co-timed with the White Flash component, thus providing for display latency (rendering latency) tests.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system to perform automated audio visual (AV) delay measurement for a system under test (SUT), comprising:
    a test pattern generator to generate a dynamic AV test pattern and connected to a source display device and to one or more destination video display devices;
    at least one light sensor coupled to the one or more destination video display devices;
    the dynamic AV test pattern in its video part contains one or more light sensor areas periodically flashing with a pre-defined period;
    the dynamic AV test pattern with an optional audio part containing a sequence of beep pulses synchronized with light sensor areas flashes;
    an AV capture device having video inputs and optional audio inputs connected correspondingly to the light sensors and audio sensors to capture dynamic AV test pattern and converting intensities of video and optional audio signals into one or more sequences of pulses, wherein all said sequences are gated by a common clock pulse generator having a repetition frequency higher than a repetition period of the AV test pattern;
    an AV delay analyzer coupled to the AV capture device to perform multi-channel delay parameters analysis, wherein video output of the AV delay analyzer is connected to a video reference input through an adapter converting a blue flash component of the test pattern into a sync pulse co-timed with a white flash component for display latency tests.

2. The system of claim 1, wherein the at least one light sensor is coupled to the source video display device.

3. The system of claim 1, comprising audio inputs connected to source and destination audio signals.

4. The system of claim 1, wherein the AV delay analyzer generates a report for documentation and a machine-readable file for automated QA/QC systems.

5. The system of claim 1, wherein the test pattern comprises audio and video components equally suitable for aural and visual estimation, on-line or off-line instrumental analysis, and fully automated on-line or off-line analysis.

6. The system of claim 1, wherein the one or more light sensor areas periodically flash with a pre-defined period during a predetermined number of video frames.

7. The system of claim 1, one or more light sensor areas regularly flash with a different pre-defined period for frame continuity tests.

8. The system of claim 1, wherein the test pattern comprises first color flashes co-timed with second color flashes for display latency (rendering latency) tests.

9. The system of claim 1, wherein the test pattern comprises audio beep pulses synchronized with one or more video flashes.

10. The system of claim 9, comprising two separate light sensor areas flashing a predetermined color during left or right frames correspondingly.

11. The system of claim 1, comprising one or more flashing light sensor areas having circles surrounded by a dark background.

12. The system of claim 1, comprising a light sensor area on a display having a full screen surface, wherein the light sensor area is larger than a display area occupied by a light sensor attached thereto, but significantly smaller than full screen surface to avoiding overloading a low bitrate compression codec with white flashing energy.

13. The system of claim 12, wherein the light sensor area is between approximately 2% to 10% of the total screen surface.

14. The system of claim 1, wherein the light sensors comprises a light-sensitive variable resistance element mounted inside small opaque body having one hole equipped with the cable fitting and a second hole allowing display screen light emission to reach the light-sensitive variable resistance element.

15. The system of claim 14, wherein the hole in the body of the light sensor is covered with a transparent vacuum cap purposed to attach the light sensor to a display screen.

16. The system of claim 15, wherein the light sensor is remotely powered from a corresponding AV Delay Analyzer input through shielded differential pair of wires for noise-immune and long distance connectivity.

17. The system of claim 16, comprising a differential receiver coupled to the differential pair of wires followed by voltage comparator to support a large range of input signal levels and noise-immune operation with an AV cable.

18. The system of claim 1, wherein activities of each AV Delay Analyzer input is indicated on a front panel.

19. The system of claim 18, comprising a light emitting diode (LED) driven by the output of a comparator to indicate activities of the AV delay analyzer.

20. The system of claim 1, wherein delay analyzer determines AV Synchronization Error as a difference between audio latency of an audio pair and video latency of a video pair.

* * * * *